(12) United States Patent
Johnson et al.

US009063531B2

(10) Patent No.: US 9,063,531 B2
(45) Date of Patent: *Jun. 23, 2015

(54) AUTOMATED PROGRAMMING SYSTEM EMPLOYING SMART INTERFACES

(75) Inventors: Bradley Morris Johnson, Edmonds, WA (US); Lev M. Bolotin, Kirkland, WA (US); Simon B. Johnson, Bonney Lake, WA (US)

(73) Assignee: Data I/O Corporation, Redmond, WA (US)

( * ) Notice: Subject to any disclaimer, the term of this patent is extended or adjusted under 35 U.S.C. 154(b) by 1719 days.

This patent is subject to a terminal disclaimer.

(21) Appl. No.: 11/381,696

(22) Filed: May 4, 2006

(65) Prior Publication Data

US 2007/0276965 A1 Nov. 29, 2007

(51) Int. Cl.
*G06F 3/00* (2006.01)
*G06F 3/01* (2006.01)
*G06F 19/00* (2011.01)
*G05B 19/00* (2006.01)
*G05B 19/042* (2006.01)

(52) U.S. Cl.
CPC ............... *G05B 19/042* (2013.01); *G06F 3/00* (2013.01); *G05B 19/00* (2013.01); *G06F 3/01* (2013.01); *G06F 19/00* (2013.01); *G05B 2219/24025* (2013.01); *G05B 2219/45063* (2013.01)

(58) Field of Classification Search
None
See application file for complete search history.

(56) References Cited

U.S. PATENT DOCUMENTS

| | | | |
|---|---|---|---|
| 5,592,373 A | 1/1997 | Barthel et al. | |
| 5,689,406 A * | 11/1997 | Wood et al. | 361/796 |
| 6,195,165 B1 | 2/2001 | Sayegh | |
| 6,487,623 B1 | 11/2002 | Emerson et al. | |
| 6,535,397 B2 | 3/2003 | Clark et al. | |
| 6,538,244 B1 | 3/2003 | Skunes | |
| 6,611,432 B2 | 8/2003 | Blood | |
| 6,625,030 B1 * | 9/2003 | Haixiong | 361/737 |
| 6,657,426 B1 * | 12/2003 | Powell et al. | 324/158.1 |
| 6,895,661 B1 | 5/2005 | Gamel et al. | |
| 2003/0084277 A1 * | 5/2003 | Przywara et al. | 713/1 |
| 2006/0123174 A1 * | 6/2006 | Nguyen et al. | 710/301 |
| 2007/0153438 A1 * | 7/2007 | Caggiano et al. | 361/62 |
| 2007/0271638 A1 * | 11/2007 | Johnson et al. | 901/3 |
| 2007/0276682 A1 * | 11/2007 | Bolotin et al. | 705/1 |

FOREIGN PATENT DOCUMENTS

JP 2003022139 1/2003

* cited by examiner

*Primary Examiner* — Tanh Nguyen
(74) *Attorney, Agent, or Firm* — Ishimaru & Associates LLP

(57) ABSTRACT

An automated programming system that includes providing a smart interface system for recognizing an intelligent module installed within the automated programming system. Configuring the intelligent module with a composite connection for transmitting information between the intelligent module and the smart interface system, and linking the intelligent module to the smart interface system for communicating information.

13 Claims, 9 Drawing Sheets

AUTOMATED PROGRAMMING SYSTEM EMPLOYING SMART INTERFACES

CROSS-REFERENCE TO RELATED APPLICATION(S)

The present application contains subject matter related to concurrently filed U.S. Provisional Patent Application Ser. No. 60/797,462. The related application is assigned to Data I/O Corporation, and the subject matter thereof is hereby incorporated herein by reference thereto.

The present application contains subject matter related to a-concurrently filed U.S. patent application Ser. No. 11/676,733. The related application is assigned to Data I/O Corporation and, and the subject matter thereof is hereby incorporated herein by reference thereto.

The present application contains subject matter related to U.S. patent application Ser. No. 11/381,532 filed May 3, 2006. The related application is assigned to Data I/O Corporation. This application is being filed contemporaneously herewith, and the subject matter thereof is hereby incorporated herein by reference thereto.

TECHNICAL FIELD

The present invention relates generally to automated systems, and more particularly to automated programming systems employing smart interfaces.

BACKGROUND ART

Presently, there are many well-known interfaces in the electronics industry for software, hardware, and mechanical modules. Unfortunately, many of these interfaces do not possess the ability to build highly proficient multi-module automated processing systems, such as a programming system, that contain fully integrated robotics systems. There are a number of reasons why these interfaces fail.

Firstly, many current processing systems are not equipped with interfaces that handle flexible plug-and-play module systems. Flexible plug-and-play module systems are important because they allow an operator to hot-swap a module that can be instantly recognized by type, configuration, and/or by location in the system.

Secondly, most known interfaces do not permit modules to be plugged into any location within a processing system feeder bank and be recognized by type, configuration, location on the feeder bank, and geometry.

Thirdly, most known interfaces are unable to communicate bi-directionally, thereby severally limiting the functionality of the system.

Lastly, interfaces provide separate interfaces for each electrical connection, mechanical fit, or software protocol interconnection so a lot of extra space is consumed to accommodate the individual electrical interfaces, the individual mechanical interfaces, and the individual software interfaces.

Thus, a need still remains for a smart interface system that can effectively communicate with and recognize modules placed within a processing system. In view of the ever-increasing need to save costs and improve efficiencies, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides an automated programming system, which includes providing a smart interface system for recognizing an intelligent module installed within the automated programming system. Configuring the intelligent module with a composite connection for transmitting information between the intelligent module and the smart interface system, and linking the intelligent module to the smart interface system for communicating information.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
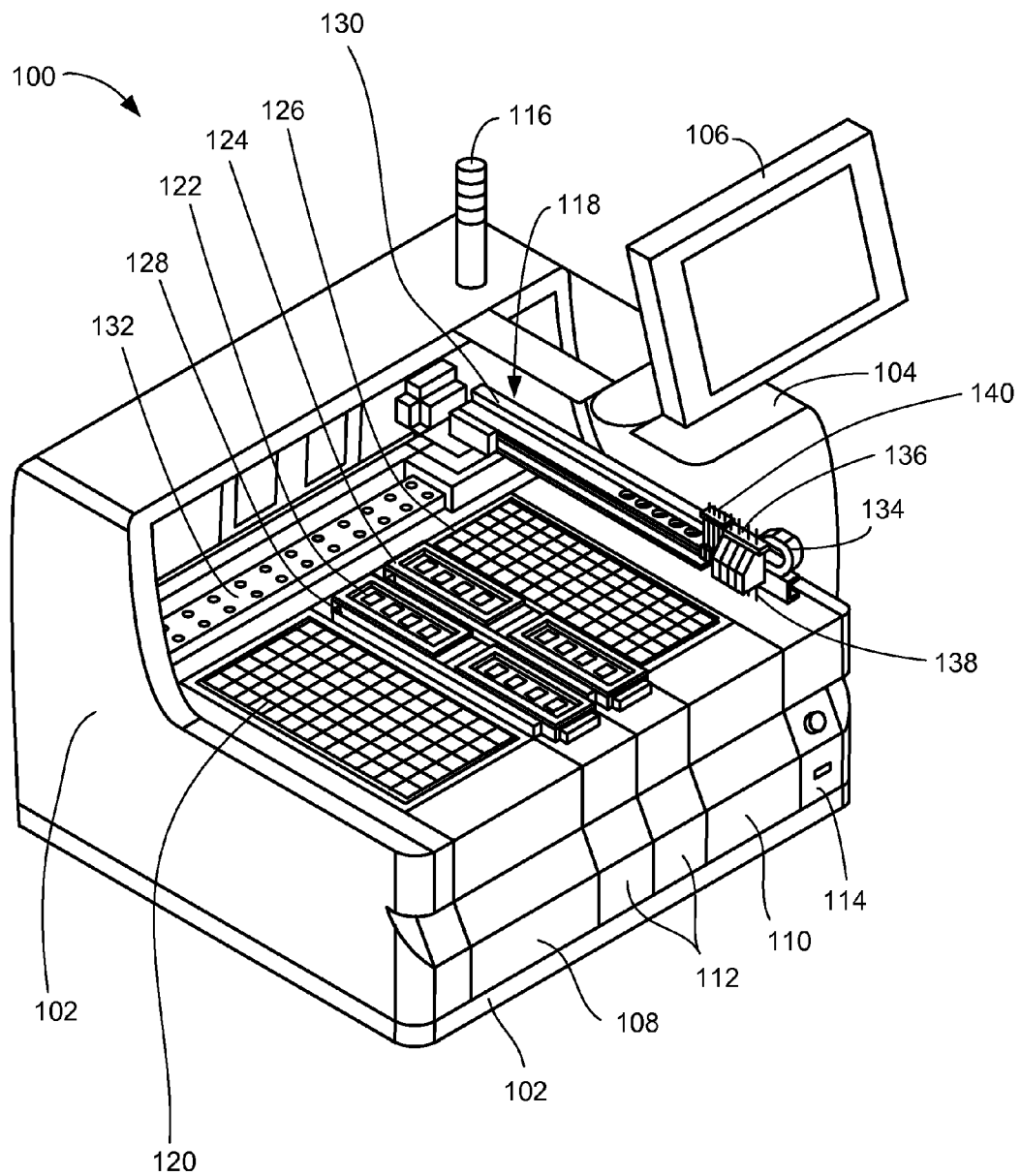
FIG. 1 is an isometric view of an automated programming system in accordance with an embodiment of the present invention.

The following embodiments are described in sufficient detail to enable those skilled in the art to make and use the invention, and it is to be understood that other embodiments would be evident based on the present disclosure and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system configurations, and process steps are not disclosed in detail. Likewise, the drawings showing embodiments of the invention are semi-diagrammatic and not to scale and, particularly, some of the dimensions are for the clarity of presentation and are shown exaggerated in the drawing FIGs. In addition, where multiple embodiments are disclosed and described having some features in common, for clarity and ease of illustration, description, and comprehension thereof, similar and like features one to another will ordinarily be described with like reference numerals.

The term "horizontal" as used herein is defined as a plane parallel to the plane or surface of the top of an automated programming system, regardless of its orientation. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane.

Referring now to FIG. 1, therein is shown an isometric view of an automated programming system 100 in accordance with an embodiment of the present invention. The automated programming system 100 includes a frame 102, a cover 104, a monitor 106, an input module 108, an output module 110, programming modules 112, control electronics 114, a status indicator 116, a robotics system 118, an input device receptacle 120, socket adapters 122, actuators 124, an output device receptacle 126, a reject bin 128, a gantry 130, a track 132, an arm 134, ahead system 136, nozzles 138, and an optics system 140.

Furthermore, although not shown, the automated programming system 100 may include additional modules, such as a marking module, a tape in module and a tape out module. However, it is to be understood that the present invention is not limited to the before-mentioned modules. Accordingly, the present invention may include any module or modules that can be designed to interface with the automated programming system 100.

As an exemplary illustration, the automated programming system 100 may include a desktop handler system with a pick-and-place mechanism. The desktop handler system is a portable automated programming system. To enhance portability of the desktop handler system, handles may be built-in.

The frame 102, such as an L-shaped base, is the main housing that holds all the elements together and provides structural support. The cover 104, the majority of which is removed for purposes of clarity, is mounted to the frame 102 and covers the input module 108, the output module 110, the programming modules 112, the input device receptacle 120, the socket adapters 122, the actuators 124, the output device receptacle 126, and the reject bin 128 (i.e.—the working envelope of the machine).

A main benefit of the cover 104 is that it prevents dust and debris from entering the working envelope. Additionally, the cover 104 may also protect an operator from unintended operational hazards.

The monitor 106 can be mounted to a fixed portion of the cover 104. By way of example and not by way of limitation, the monitor 106 may include a touch screen user interface system that provides visual feedback to the operator.

Devices and/or media enter and exit the automated programming system 100 via removable modules, such as the input module 108 or the output module 110. Alternatively, the devices and/or media can be placed within or removed from the automated programming system 100 without removing the input module 108 and the output module 110 from the automated programming system 100. By way of example, the input module 108 and the output module 110 may be configured to accommodate trays or other receptacles, which conform to Joint Electron Device Engineering Council (JEDEC) standards. However, it is to be understood that the present invention is not to be limited to such configurations. In accordance with the present invention the input module 108 and the output module 110 may accommodate any device receptacle.

The programming modules 112 provide the core processing interface for the automated programming system 100. The programming modules 112 include one or more removable modules that interface with the automated programming system 100. Each of the programming modules 112 contains the socket adapters 122, the actuators 124, and the reject bins 128. After the devices, such as unprogrammed programmable media, are placed within the socket adapters 122, the actuators 124 close the socket adapters 122 so that the devices are appropriately connected to the programming modules 112 of the automated programming system 100. Additionally, the programming modules 112 can be controlled by the automated programming system 100 for facilitating configuration setup and manual operations, such as placing and removing programmable media.

Additionally, by way of example, each of the modules within the automated programming system 100 may include a module control system, which allows each module to be set-up for purposes of programming, configuration, and identification. Alternatively, instead of placing the module control system as part of each module, the module control system and its function can be integrated as part of the touch screen user interface system displayed by the monitor 106.

The control electronics 114 are also mounted to the frame 102. The control electronics 114 provide an electrical interface for the automated programming system 100. For example, the control electronics 114 may possess a power ON/OFF switch, digital input/output boards, and/or an energy chain stop button. Additionally, the control electronics 114 provides an interface for peripheral devices, such as a USB device, a keyboard, a mouse, etc.

Notably, the automated programming system 100 does not rely on external air, pneumatic or vacuum systems, which greatly enhances the portability of the machine and ease of installation. The automated programming system 100 possesses an on-board vacuum/air system that is powered by electrical current, therefore, the automated programming system 100 is a self-sufficient system that only requires electrical power for operation. Additionally, the back of the automated programming system 100 may possess additional power modules.

The status indicator 116 is also mounted on the frame 102. The status indicator 116 provides visual feedback, via a non-text error signal, to the user about machine status. As an exemplary illustration, the status indicator 116 may use a multi-color scheme employing more than one light combination. The particular combination can be done in such a way that a green light indicates the machine is in operation, a yellow light indicates that attention may be needed soon and a red light indicates there may be a problem, and the machine is stopped, or that the job has terminated normally. However, it is to be understood that any color scheme may be used to convey the notions of operation-ready, attention may be needed soon, and operation-termination.

During operation, the robotics system 118 retrieves one or more devices (not shown) from the input device receptacle 120, located over the input module 108. The robotics system 118 then transports the device(s) to the programming modules 112 which possess the socket adapters 122 and the actuators 124. Once the socket adapters 122 engage the devices, programming may commence. Once programming is complete, the robotics system 118 then transports the good devices to the output device receptacle 126 and transports the bad devices to the reject bin 128.

The robotics system 118 employs a cantilevered design that is attached to an L-shaped base, which is part of the frame 102. The robotics system 118 includes the gantry 130, the track 132, the arm 134, the head system 136, the nozzles 138, and the optics system 140. The gantry 130 supports the arm 134, the head system 136, the nozzles 138, and the optics system 140. The gantry 130 slides back and forth (i.e.—in the X direction) across the track 132. The head system 136, the nozzles 138, and the optics system 140 slide back and forth (i.e.—in the Y direction) across the arm 134 supported by the gantry 130. The head system 136 may additionally move up and down (i.e.—in the Z direction) and rotate (i.e.—in the theta direction).

The head system 136, may include by way of example and not by way of limitation, a pick-and-place head system, which can employ multiple design configurations, such as a multi-probe and nozzles design. The head system 136 is a small sized, lightweight system to facilitate fast and accurate movements. Imprecise movements of the head system 136 are accommodated for by a built-in compliance mechanism, such as a mechanical sprint and/or an electromechanical control mechanism for the Z-axis motors. More generally, the built-in compliance mechanism can be based upon mechanical principles, such as a spring, or upon electrical principles.

A vacuum on/off control and a vacuum sensor can also be regulated by the head system 136 electronics.

The head system 136 may be powered by an electrical stimulus, a pneumatic stimulus or any stimulus that produces the desired result of moving the head system 136. Uniquely, the nozzles 138 of the head system 136 do not rely on an external air supply. If pneumatics are used to operate the nozzles 138, they are provided via an on-board vacuum generation system. Therefore, the automated programming system 100 can be designed to only require electrical power for operation. By not requiring each potential operations facility to possess a clean and special external air supply, the automated programming system 100 becomes universally portable and employable.

The robotics system 118, and more generally the automated programming system 100, can be controlled by a user interface system, such as a graphical non-text user interface system. In accordance with the scope of the present invention, a non-text user interface system uses only numbers, characters, pictorial representations and symbols to communicate information to an operator and not written words. The user interface system can provide feedback to an operator via visual or auditory stimulus.

The user interface system, displayed by the monitor 106, provides a real time image of the working envelope (i.e.—the system configuration). By mimicking the real time configuration of the working envelope, the monitor 106 helps to visualize the machine operations and eliminate operator mistakes during set up of the automated programming system 100. Additionally, the real time image on the monitor 106 can increase operator productivity due to its accurate representation of the working envelope.

Not only does the user interface system display a real time image of the working envelope, but it may also provide programming setup and status information. In general, the user interface system of the present invention includes the following categories to control a programming system: job selection, programming, device and hardware detection, and statistical job feedback. These categories are controlled via a plethora of functions, such as job status inquires, job control, job tools, socket use, job selection, receptacle map, and measure receptacle. These functions provide a workable user interface for the automated programming system 100 that do not require textual representation, and therefore allow global application of the user interface.

Additionally, the user interface system can be configured for remote operation, as well as, remote diagnostics access.

Furthermore, the user interface system includes an automatic receptacle mapping feature, which the robotics system 118 may employ. The automatic receptacle mapping feature is enhanced by smart interface technology, which assimilates information from intelligently designed modules interfaced with the automated programming system 100. For example, smart interface technology may sense the type of module being used, the physical configuration of a module, and the type of receptacle being used.

Generally, the automatic receptacle mapping feature will automatically measure the physical characteristics and geometry of a receptacle, such as the number of rows and columns, the row offset and pitch, and the column offset and pitch. These automatic measurements provide information about the exact coordinates (i.e.—X, Y, Z and theta directions or sometimes only X and Y directions) for each center of pocket within each receptacle (i.e.—the location for each device).

The automatic receptacle mapping feature employs optical methods based upon, changes of state, such as reflectivity, and specifically designed algorithms to calculate receptacle location, geometry and physical characteristics. This mapping feature is designed in such a way that the operator no longer has to manually enter in the physical characteristics and geometry of the receptacle, which saves the operator time and prevents operator input error.

Additionally, the automated programming system 100 has been configured to accept modules with intelligent design. These intelligently designed modules are configured to interface with the automated programming system 100, wherein the automated programming system 100 immediately recognizes module information, such as the identification of the module (i.e.—the type of module, the configuration of the module, and the geometry of the module) and the location of the module within the system or feeder bank. For example, configuration information about the programming modules 112 may include socket count, socket pitch, socket offset, socket location, and the number of programming sites. On the other hand, an intelligently designed tape module may simply provide information about the pocket offset. Intelligently designed modules will be discussed in greater detail in FIG. 2.

Figure 2:
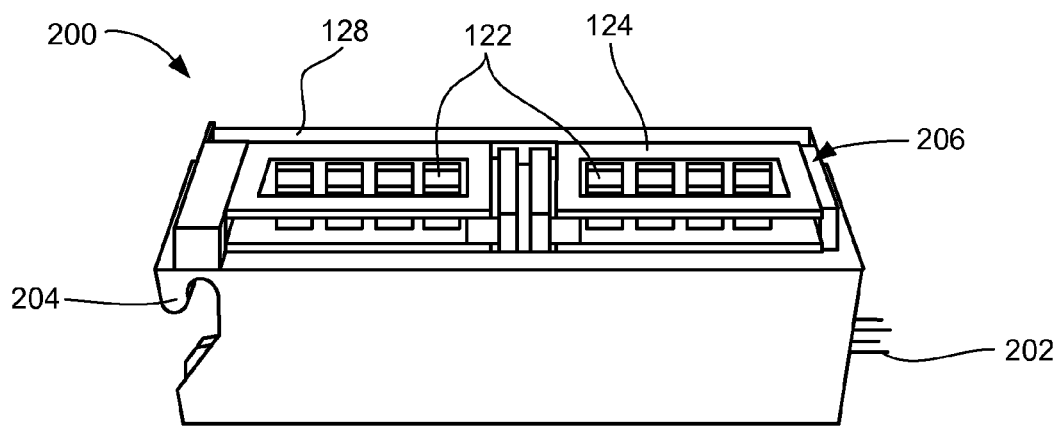
FIG. 2 is an isometric view of an intelligent module in accordance with an embodiment of the present invention.

Referring now to FIG. 2, therein is shown an isometric view of an intelligent module 200 in accordance with an embodiment of the present invention. The intelligent module 200 may also be known as a smart module. Although, FIG. 2 depicts the intelligent module 200 as an intelligent programming module, the intelligent module 200 may include modules, such as an intelligent input module and an intelligent output module. However, the intelligent module 200 is not to be limited to above representations and examples, the intelligent module 200 may include any module, which can be interfaced with the automated programming system 100, of FIG. 1.

Generally, the intelligent module 200 includes a module of intelligent design with a composite connection 202, handles 204 (for easy transport), and hot swapping capability. The composite connection 202 permits automatic recognition of the module interfaced with the automated programming system 100, or more specifically, interfaced with a smart interface system (not shown).

As exemplary illustrations, the composite connection 202 may transmit information about whether the operator has installed a module, such as the input module 108, of FIG. 1, the output module 110, of FIG. 1, or the programming module(s) 112, of FIG. 1. Furthermore, by way of example, the composite connection 202 may permit transference of information, such as the identification of the module (i.e.—the type of module, the configuration of the module, and the geometry of the module), the location of the module within the system, and also status/error conditions about the module, as well. Additionally, by way of example, the composite connection 202 may also transmit command information and status information to and from the module, such as the status of the actuators 124, whether or not the actuators 124 are opened or closed, whether or not the reject bin 128 has been installed, and whether or not a receptacle has been installed.

The composite connection 202 may employ a pin contact system, wherein certain pins are longer than others. This will enable some pins to contact an electrical interface, first. This length of pin contact system can create a prioritized port access read time. However, it is to be understood that the present invention may also provide the composite connection 202 with a pin contact system of equal length.

Notably, intelligently designed modules are capable of being hot swapped. Hot swapped, hot swappable and/or hot swapping means that a module can be unplugged from the automated programming system 100 while it is running, and another one plugged in, without having to shut down the automated programming system 100. By maintaining the module identification information and the ability to communicate such information within each intelligently designed module, the timely and costly process of reconfiguring the automated programming system 100 is avoided.

More specifically, the intelligent module 200 (i.e.—depicted as an intelligent programming module) includes the above features but also includes the following features: an auto-adjusting force limit system for socket actuation, programming sites 206, the socket adapters 122, and the actuators 124. For example, the auto-adjusting force limit system allows the actuators 124 to generate a large force value, but only apply the force that is necessary to open the socket adapters 122. The auto-adjusting force limit system helps to prevent damage to the socket adapters 122, and consequently, prolongs their life.

The intelligent module 200 is also depicted as possessing two of the programming sites 206 per module; however, the intelligent module 200 may include one or more of the programming sites 206 per module as required by the design parameters of the automated programming system 100. Additionally, the intelligent module 200 depicts four of the socket adapters 122 per each of the programming sites 206; however, the programming sites 206 may include one or more of the socket adapters 122 as required by the design parameters of the automated programming system 100.

The intelligent module 200 may also include a module control system, which allows each module to be set-up for purposes of programming, configuration, and identification. Alternatively, instead of placing the module control system on each module, the module control system and its function can be integrated as part of the touch screen user interface system displayed by the monitor 106, of FIG. 1. The reject bin 128 may be mounted on a side of the intelligent module 200, to provide clear visual feedback to the operator about, which of the programming sites 206 is committing the biggest failure percentage. This qualitative measure informs the operator about potential failure of one of the programming sites 206 or one of the socket adapters 122.

Figure 3:
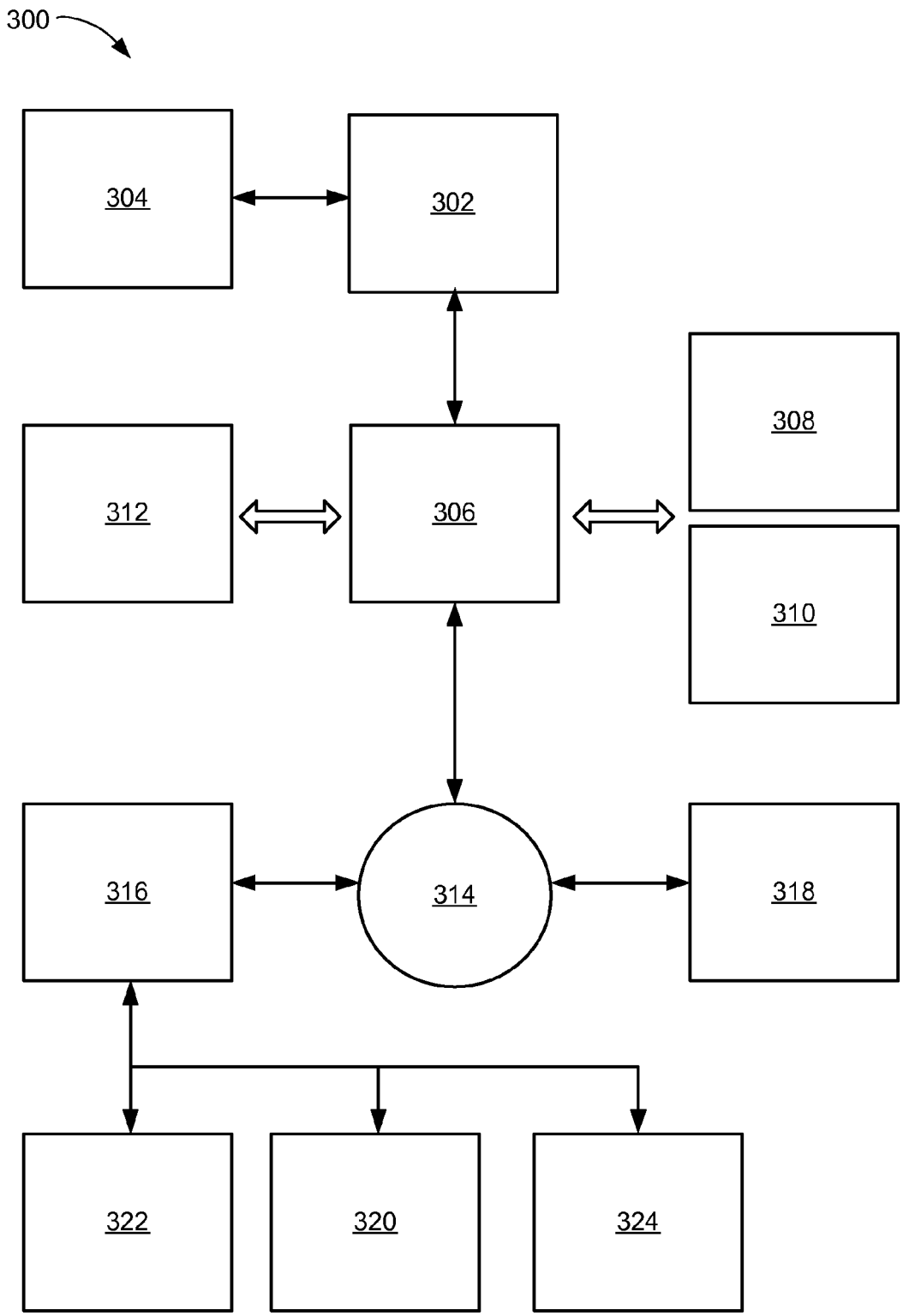
FIG. 3 is a system communications diagram for the automated programming system in accordance with an embodiment of the present invention.

It is to be understood that FIG. 3 depicts by way of example and not by way of limitation, an exemplary automated programming system communication diagram, and it is not to be construed as limiting.

Referring now to FIG. 3, therein is shown a system communications diagram 300 for the automated programming system 100, of FIG. 1, in accordance with an embodiment of the present invention. Initially, a customer determines a particular need for a device in a block 302. The programming job needed to create the customers device is then developed in a block 304. Notably, the programming job creates a data image file that is specific to the requested device, which can be reused for different iterations of the programming job.

The programming job is then sent to the automated programming system 100 via an Ethernet connection in a block 306. Additionally, the programming job can also be sent to the automated programming system 100 via a flash drive in a block 308, or via a hard drive in a block 310. More specifically, portions of the programming job, such as a device image or a programming algorithm, are sent to the automated programming system 100 via the Ethernet connection and the source of the programming job can be downloaded via an internal hard drive, an external network drive, a USB Flash drive, or any other host-attached peripheral storage unit.

The automated programming system 100 may receive additional input from a user interface system, such as a touch screen video display, in a block 312. For example, the user interface system can modify, accept or reject module setup, respond to warnings, and start/stop the programming job sent to the automated programming system 100. The automated programming system 100 then sends the programming job information to a processing system in a block 314.

The processing system then sends instructions to a robot controller, in a block 316, and to programmers in a block 318. The robot controller then manipulates a head system, such as a pick-and-place head system, in a block 320, that travels along a robot gantry system in a block 322. The head system transports devices between the input/output modules, in a block 324, and the programmers in the block 318. After programming is complete, the devices are returned to the input/output modules of the block 324.

Figure 4:
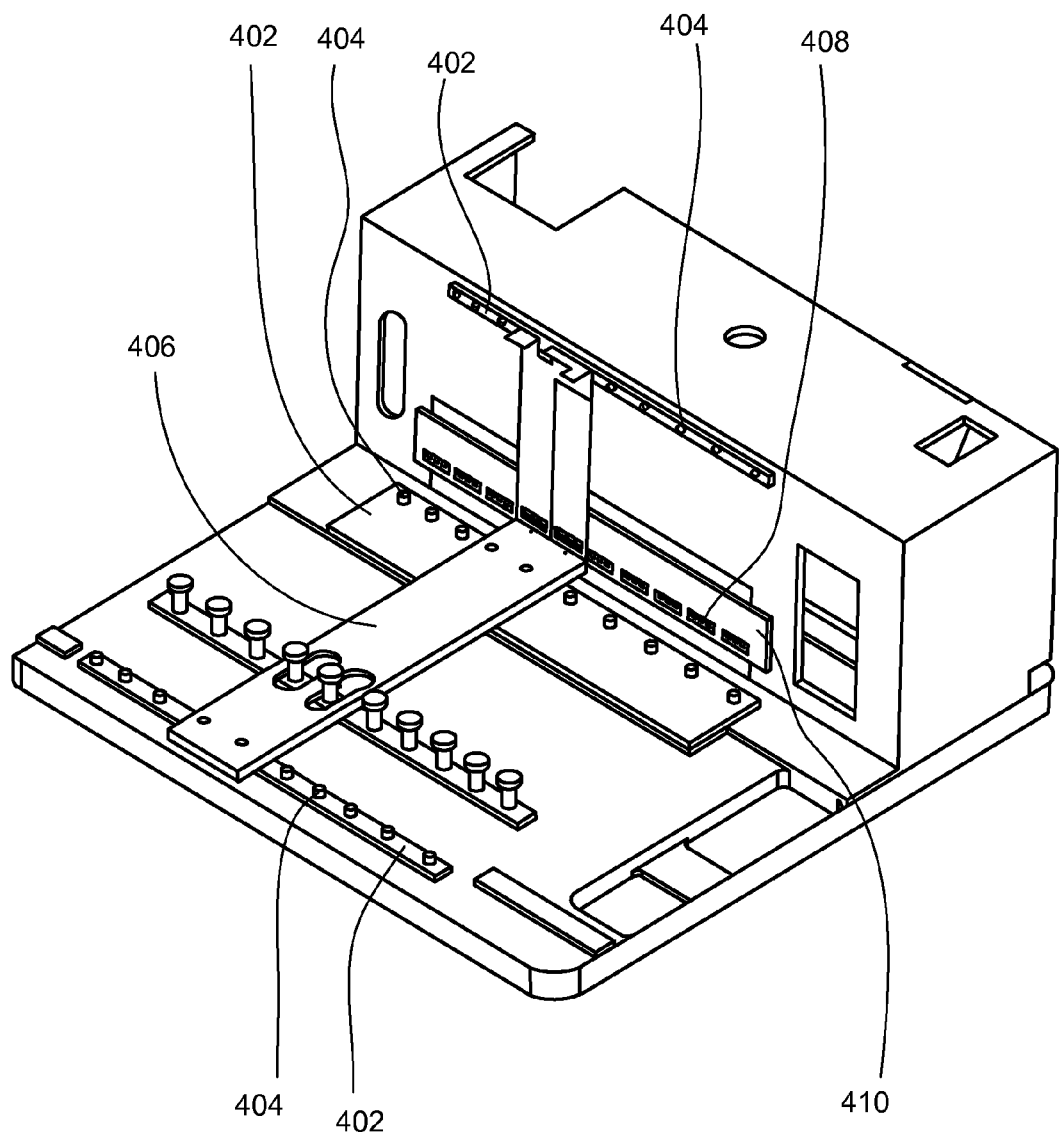
FIG. 4 is an isometric view of an L-shaped base in accordance with an embodiment of the present invention.

Referring now to FIG. 4, therein is shown an isometric view of an L-shaped base in accordance with an embodiment of the present invention. The L-shaped base is a rigid, lightweight, cast, yet "open" platform that allows easy access to the working envelope of the automated programming system 100, of FIG. 1. The L-shaped base includes datum registration features 402, alignment features 404, an interface plate 406, a smart interface system 408 and a protective cover 410. In at least one embodiment, the interface plate 406 may also include an L-shaped structure substantially similar to that of the L-shaped base. The datum registration features 402 help to roughly align the modules within a certain coarse location within the L-shaped base. The fine alignment of modules within the L-shaped base can be achieved by fiducial points located on each module, which also help to guide the composite connection 202, of FIG. 2, into the smart interface system 408.

The alignment features 404 provide a mechanism for engaging the interface plate 406. By aligning the interface plate 406 with the alignment features 404, the operator is ensured that the interface plate 406 is installed correctly. Moreover, the interface plate 406 ensures uniform mounting of modules within the automated programming system 100.

Additionally, the L-shaped base also facilitates the incorporation of a feeder bank with the automated programming system 100. The feeder bank provides a consistent interface for each module installed within the smart interface system 408.

The smart interface system 408 provides a communication backplane for modules installed within the automated programming system 100. For example, the composite connection 202 attaches to the smart interface system 408 and transmits power and information through ports, such as a data port, a control port, a power port. The smart interface system 408 provides an easy integration mechanism for the automatic recognition of modules during setup of the automated programming system 100.

By incorporating the smart interface system 408 as part of the L-shaped base, the modules can now be plugged into almost any location along the feeder bank. Accordingly, an operator may configure the modules as close as possible to maximize throughput or the operator can plug the modules into certain locations to minimize processing trouble.

The protective cover 410 provides mechanical protection to the smart interface system 408.

Figure 5:
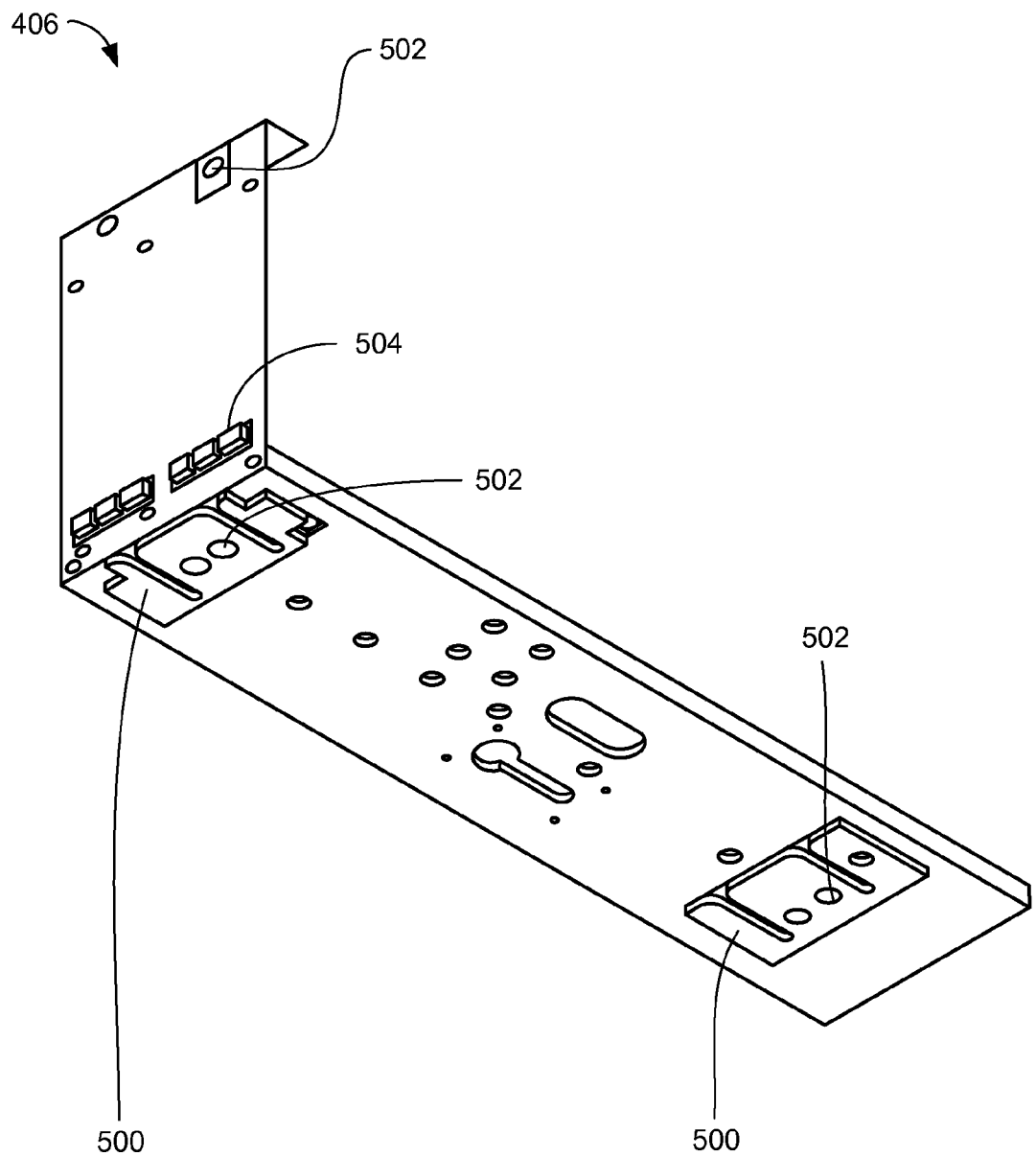
FIG. 5 is a top view of an interface plate in accordance with an embodiment of the present invention.

Referring now to FIG. 5, therein is shown a top view of the interface plate 406 in accordance with an embodiment of the present invention. The interface plate 406 can be made from any type of material, conducting to non-conducting. The interface plate 406 includes datum registration regions 500, alignment apertures 502, and electrical conduits 504. The datum registration regions 500 help to align the interface plate 406 such that the electrical conduits 504 are appropriately aligned with the smart interface system 408, of FIG. 4.

The alignment apertures 502 provide openings for the alignment features 404, of FIG. 4. By mating the alignment features 404 within the alignment apertures 502, it can be assured that the interface plate 406 is aligned correctly. The alignment features 404 and the alignment apertures 502 also provide a reliable and repeatable mechanism that ensures the registration of each module. Additionally, the alignment features 404 and the alignment apertures 502 provide a secure connection that prevents an operator from accidentally unplugging a module.

Figure 6:
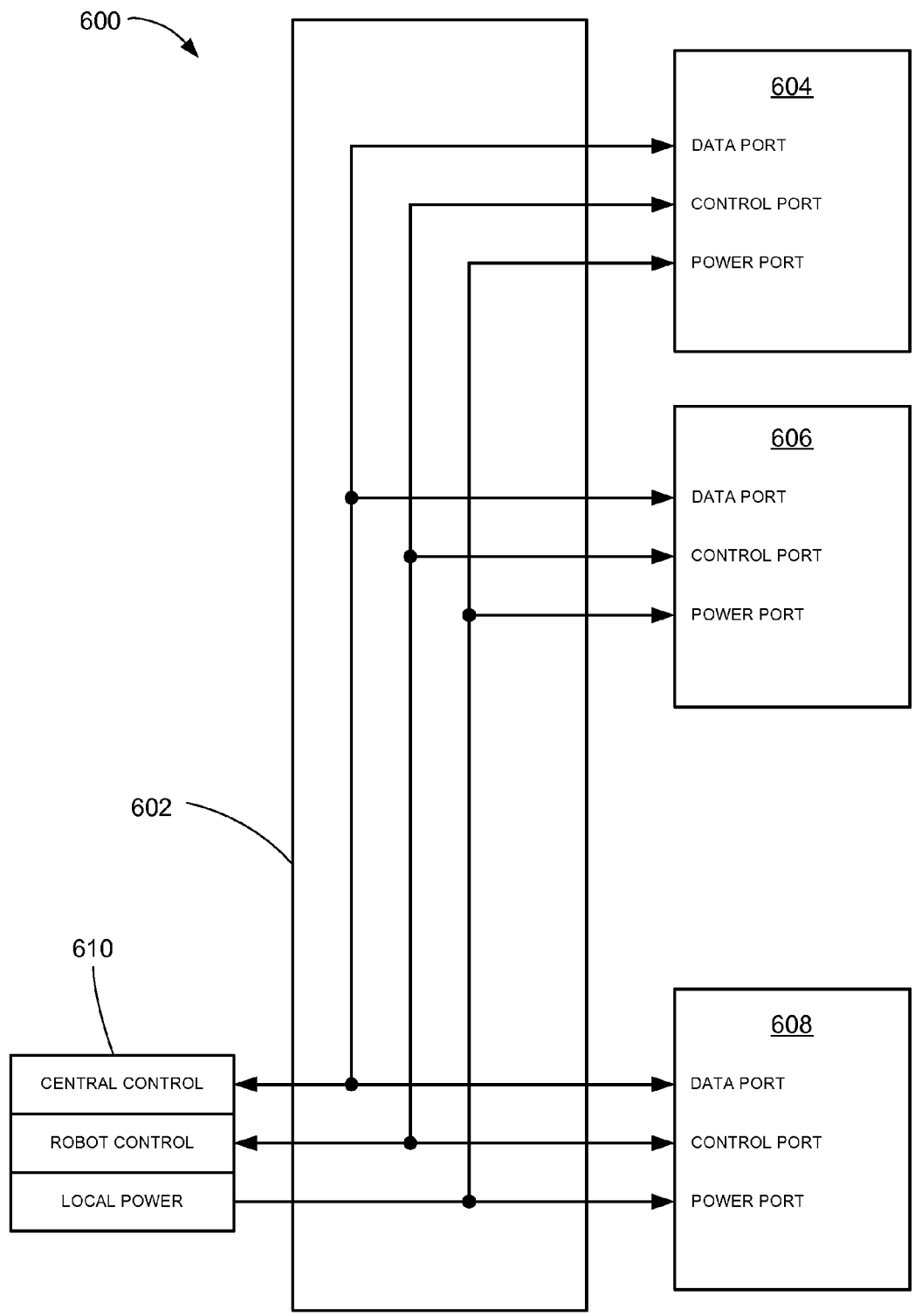
FIG. 6 is a power and communication diagram for a smart interface system in accordance with an embodiment of the present invention.

The electrical conduits 504 provide access to the smart interface system 408. Each of the electrical conduits 504 possesses three ports, one for power, another for control, and the last for data. Track identification information about each module is transmitted through the control port. FIG. 6 will describe the function of each port in greater detail.

Referring now to FIG. 6, therein is shown a power and communication diagram 600 for the smart interface system 408, of FIG. 4, in accordance with an embodiment of the present invention. The power and communication diagram 600 includes a backplane 602, a first intelligent module 604, a second intelligent module 606, an $N^{th}$ intelligent module 608, and a controller 610. Generally, the backplane 602 provides a data, control, and power, communication interface for the smart interface system 408, of FIG. 4.

For example, the backplane 602 may provide a transmission interface for the first intelligent module 604, the second intelligent module 606, and the $N^{th}$ intelligent module 608, wherein the $N^{th}$ intelligent module 608 represents any module number greater than one. Each of the modules contains a data port, a control port, and a power port. Track identification information, such as the physical location of each module, is transmitted through the control port.

As exemplary illustrations, the data port can be used to broadcast device image data, send commands, and receive status information for programming operations. Due to the volume of data transmitted by the data port, a high-speed port, such as an Ethernet connection is usually employed. Any module that would require the transmission of large amounts of data could use the data port. The control port can be used to transmit commands to and status from the modules. The power port transmits power to each module through the backplane 602. The power supplied to each module via the power port can be electrical, but in principle, it could be mechanical, pneumatic, hydraulic, magnetic, optical, and/or chemical.

The data port, the control port, and the power port are collectively referred to as the composite connection 202, of FIG. 2. As the composite connection 202 may protrude from the module, a mechanical protection scheme can be designed to protect it from accidental damage.

The composite connection 202 may also employ a hardware based naming format. This format will allow configurable hardware switches on each module that not only differentiate by the type of module, but also by the serial number of each module.

The composite connection 202, when coupled to the smart interface system 408, may employ a mechanical fit connection that consists of pins and spring-loaded washers. Each module may use an identical set pitch for the composite connection 202 pins. This type of configuration provides for uniform mounting and consistent registration for each of the composite connection 202. Additionally, the pin and spring loaded washer type of connection establishes a reliable and repeatable tool-less installation that requires minimal time. Each module can be installed by merely establishing preliminary contact and then registering or locking in place.

Each modules data port, control port and power port aligns with a central control, a robot control, and local power, respectively, within controller 610. The controller 610 acts as a processing component for receiving and transmitting information between the non-text user interface system and each of the modules.

Each of the control ports includes a track information system for communicating track identification information with the backplane 602. The track identification information may include a unique identification number and a unique location designation. For example, the first intelligent module 604, the second intelligent module 606, and the $N^{th}$ intelligent module 608 each possess the ability to transmit track information.

The software protocol that delivers information through the data port and the control port is a bi-directional protocol. For example, the data port can use an Ethernet port and the control port can use a Controller Area Network (CAN) port with a hard coded segment for carrying track identification information. This bi-directional protocol allows for data and controls (digital and analog) communication. Each module may use this common protocol to enhance interchangeability within the system.

The software protocol can also employ a multiple master system, which allows any component within the automated programming system 100, of FIG. 1, to request or send data. For example, the input module 108, of FIG. 1, could request data from one of the programming modules 112, also of FIG. 1, without any need for the robot controller within the controller 610 to initiate a transverse request. The software protocol also includes a messaging system, which can relay information between components. For example, the messaging system can relay information about whether or not the socket adapters 122, of FIG. 1, are open or closed, and what type of modules are installed within the system.

Figure 7:
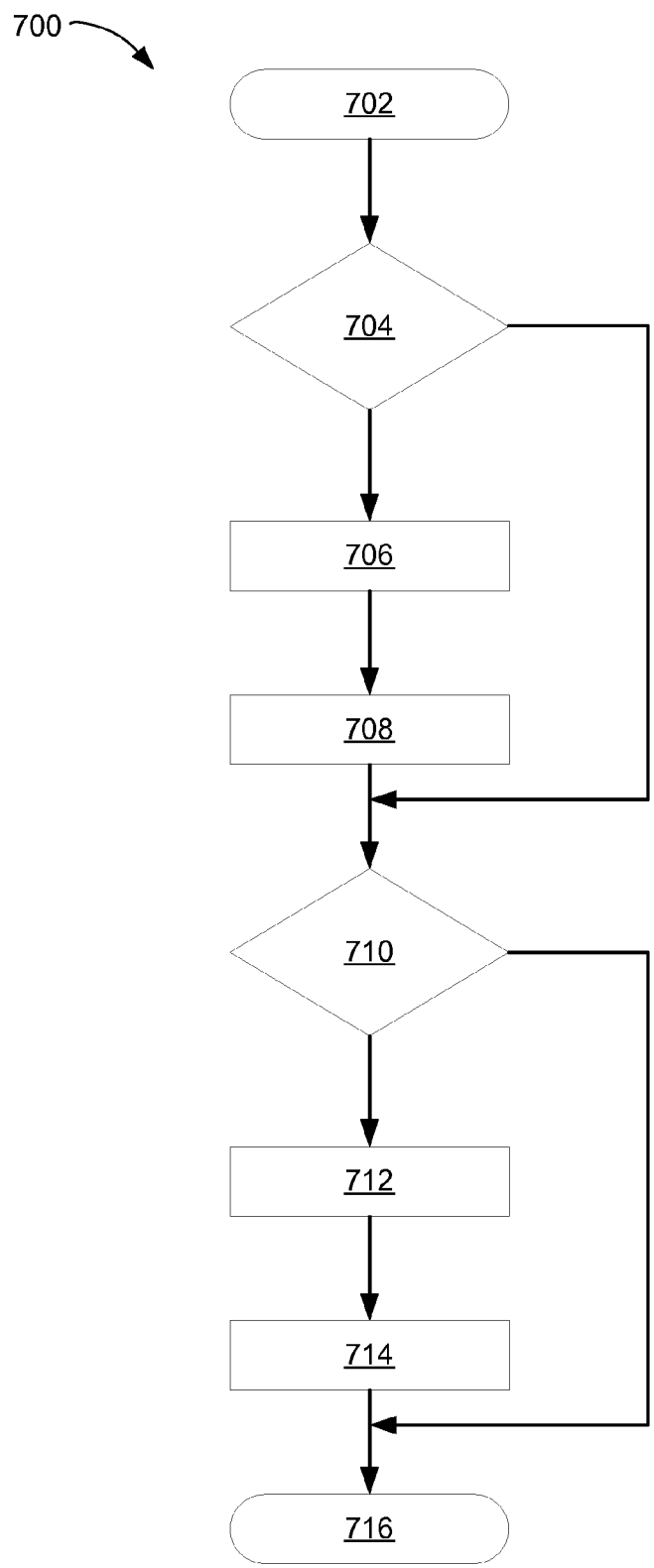
FIG. 7 is a module Internet Protocol (IP) address assignment flow diagram in accordance with an embodiment of the present invention.

The messaging system may include a prioritized messaging system, wherein both of these systems are based on the CAN protocol. The present invention employs a unique set of CAN messages. All messages within the CAN system are based on a message number, with lower numbered messages receiving the higher priority. So if two messages are sent simultaneously, the message with the lowest value will get through, and the other message will have to wait and be retransmitted at a later date Referring now to FIG. 7, therein is shown a module Internet Protocol (IP) address assignment flow diagram 700 in accordance with an embodiment of the present invention. The module IP address assignment flow diagram 700 is applicable to all types of modules that employ a data port. Generally, the need to assign a dynamic module IP address arose from the need to coordinate Ethernet communications with a modules physical location. In other words, it was a way to correlate Ethernet packets with a physical destination. Additionally, dynamic module IP address assignment also solves a secondary problem associated with being able to swap programmer modules with other automated programming handlers. As opposed to static IP assignment, dynamic module IP address assignment ensures that no two programmer modules will have the same IP address.

For ease of discussion, the following exemplary illustration of the module IP address assignment flow diagram 700 will be discussed with respect to a programmer module. Initially, the module IP address assignment flow diagram 700 begins with a start function in a block 702. Next, the module control system, described in FIG. 1, determines if there is a first programmer module installed in a block 704.

If no, then the module control system skips to a block 710. If yes, then the module control system determines if it is a first programmer module, and if so, it sends track and location (front/back) information to the first programmer module in a block 706. The first programmer module then assigns the last four digits of an IP address, based upon location and track information received from the module control system, that uniquely identifies the first programmer module in a block 708. Notably, this sequence of steps can happen concurrently for multiple programmer modules.

Next, the module control system now determines if there is a second programmer module installed in the block 710. If no, then the module control system skips to a block 716. If yes, then the module control system determines if it is a second programmer module, and if so, it sends track and location (front/back) information to the second programmer module in a block 712. The second programmer module then assigns the last four digits of an IP address, based upon location and track information received from the module control system, that uniquely identifies the second programmer module in a block 714. Notably, this sequence of steps can happen concurrently for multiple programmer modules.

Finally, the process comes to an end command in the block 716. However, this process may continue for as many iterations as there are programmer modules. For example, if there are N programmer modules, wherein N represents a number greater than one, then the process may continue for N number of iterations.

Figure 8:
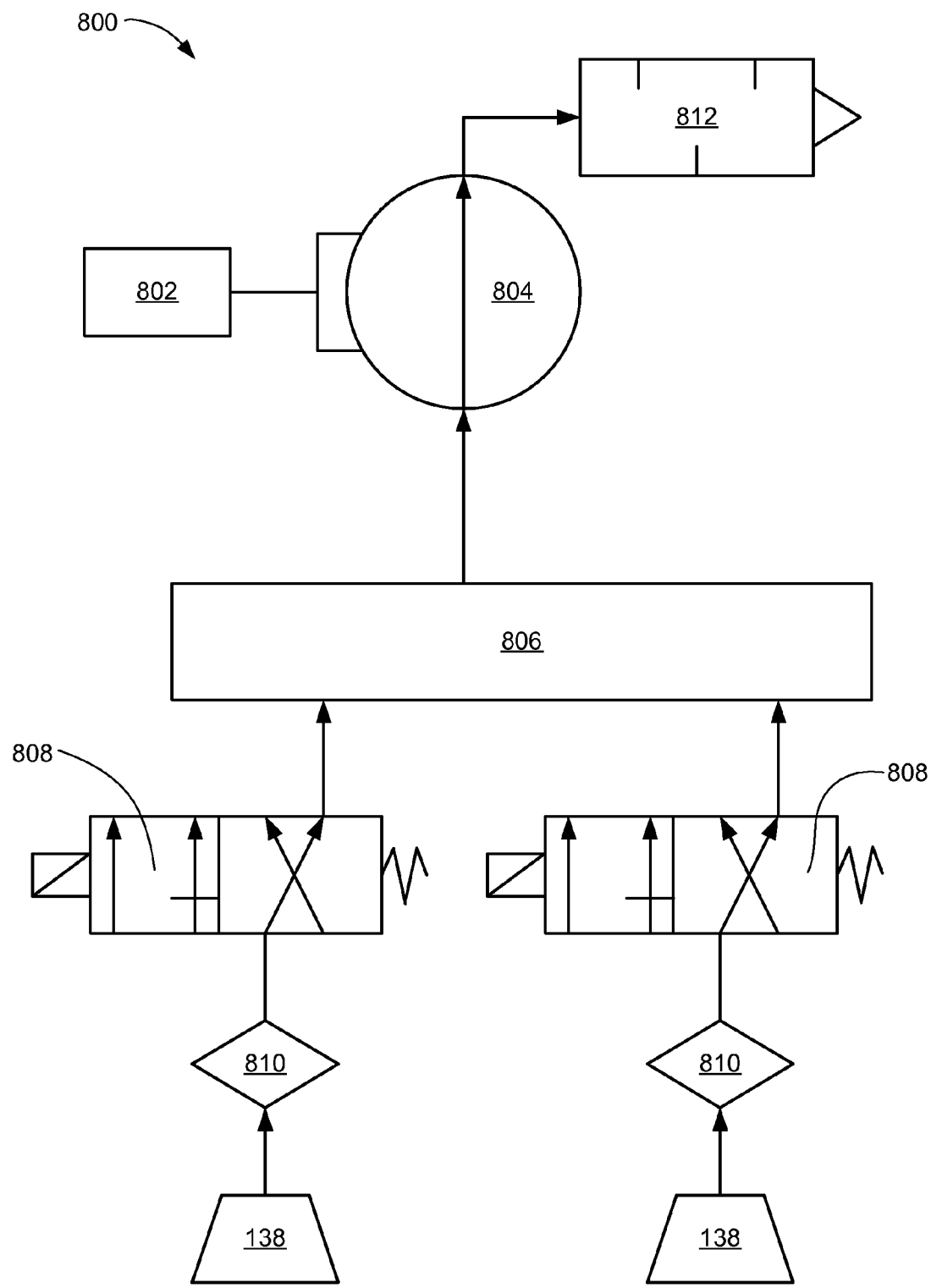
FIG. 8 is a schematic representation of a vacuum system in accordance with an embodiment of the present invention.

Referring now to FIG. 8, therein is shown a schematic representation of a vacuum system 800 in accordance with an embodiment of the present invention. The vacuum system 800 includes the nozzles 138, an electric motor 802, a vacuum pump 804, a vacuum manifold 806, valves 808, filters 810, and a silencer 812. The electric motor 802 provides rotational power to the vacuum pump 804. The vacuum pump 804 creates a pressure differential that draws in air through the vacuum manifold 806.

Whether or not the vacuum system 800 draws a vacuum through the nozzles 138 depends on the valves 808. The controller 610, of FIG. 6, controls the valves 808. If the controller 610 requires the nozzles 138 to pick-up a device, then the valves 808 are opened. If the controller 610 requires the nozzles 138 to place a device, then the valves 808 are closed.

The vacuum system 800 also includes the filters 810 that prevent contaminants from entering the mechanical portions of the vacuum system 800. Additionally, if desired, the silencer 812 can be added to the vacuum pump 804 to reduce the decibel output of the system.

Notably, the vacuum system 800 enables the automated programming system 100, of FIG. 1, to no longer rely on an external vacuum, because the vacuum system 800 is an on-board electrically powered vacuum system. Consequently, the automated programming system 100 now becomes a self-sufficient, highly portable system that only requires an electrical current for operation.

Figure 9:
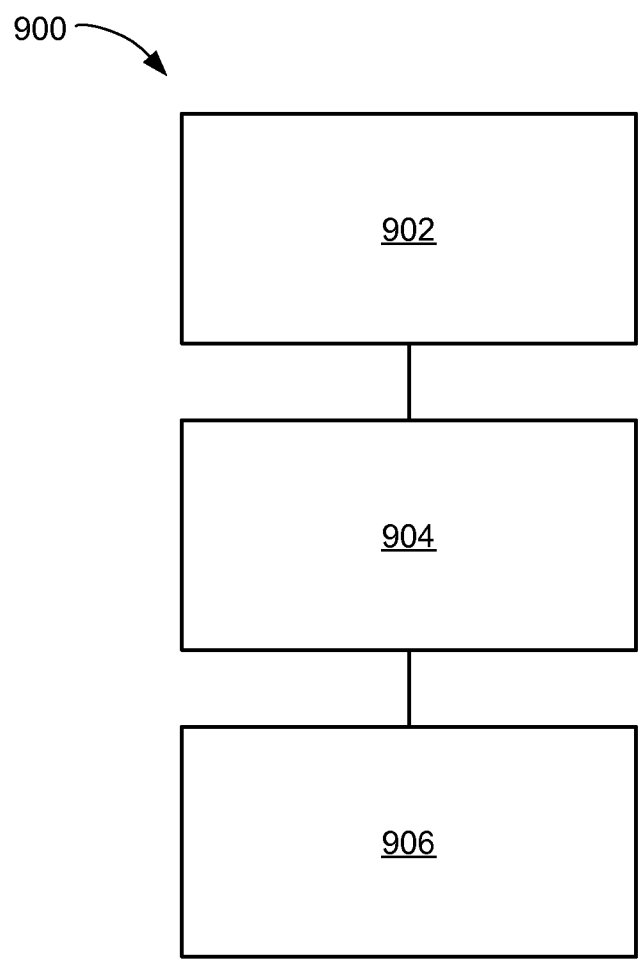
FIG. 9 is a flow chart for an automated programming system for fabricating an automated programming system in accordance with an embodiment of the present invention.

Referring now to FIG. 9, therein is shown a flow chart for an automated programming system 900 for fabricating the automated programming system 100 in accordance with an embodiment of the present invention. The automated programming system 900 includes providing a smart interface system for recognizing an intelligent module installed within the automated programming system in a block 902; configuring the intelligent module with a composite connection for transmitting information between the intelligent module and the smart interface system in a block 904; and linking the intelligent module to the smart interface system for communicating information in a block 906

From the above it will be understood that the present invention is applicable to what can be described as "devices" or "media". Devices and/or media include a broad range of electronic and mechanical devices. The best mode describes programming of devices and/or media, which include, but are not limited to, Flash memories (Flash), electrically erasable programmable read only memories (EEPROM), programmable logic devices (PLDs), field programmable gate arrays (FPGAs), and microcontrollers. However, the present invention encompasses programming for all electronic, mechanical, hybrid, and other devices or media, which require testing, measurement of device characteristics, calibration, and other programming operations. For example, these types of devices and/or media would include, but not be limited to, microprocessors, integrated circuits (ICs), application specific integrated circuits (ASICs), micro mechanical machines, micro-electro-mechanical (MEMs) devices, micro modules, and fluidic systems.

It has been discovered that the present invention thus has numerous aspects. A principle aspect is that the smart interface system automatically recognizes module information, such as the identification of the module (i.e.—the type of module, the configuration of the module, and the geometry of the module) and the location of the module through a composite connection. The automatic recognition of a module by the smart interface system reduces operator setup time.

Another aspect of the present invention is that the automated programming system employs an on-board vacuum system. Consequently, the automated programming system now becomes a self-sufficient, highly portable system that only requires an electrical current for operation.

These and other valuable aspects of the present invention consequently further the state of the technology to at least the next level.

Thus, it has been discovered that the automated programming system of the present invention furnishes important and heretofore unknown and unavailable solutions, capabilities, and functional aspects. For instance, the automated programming system of the present invention employs a smart interface system that reduces operator setup time. The resulting processes and configurations are straightforward, cost-effective, uncomplicated, highly versatile and effective, can be implemented by adapting known technologies, and are thus readily suited for efficient and economical manufacturing.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the scope of the included claims. All matters hithertofore set forth herein

The invention claimed is:

1. A method of fabrication of an automated programming system comprising:
   providing a smart interface system for automatically recognizing an intelligent module, installed within the automated programming system, by a bi-directional protocol, the automated programming system including an L-shaped interface plate;
   configuring the intelligent module with a composite connection for transmitting information between the intelligent module and the smart interface system including configuring the L-shaped interface plate between the intelligent module and the smart interface system; and
   linking the intelligent module to the smart interface system for communicating information.

2. The method as claimed in claim 1 wherein:
   configuring the intelligent module with the composite connection includes supplying a data port, a control port, and a power port.

3. The method as claimed in claim 1 wherein:
   linking the intelligent module to the smart interface system includes bi-directional communication.

4. The method as claimed in claim 1 wherein:
   linking the intelligent module to the smart interface system includes transmitting type, location, configuration, status, commands, and geometry information.

5. An automated programming system comprising:
   a smart interface system for automatically recognizing an intelligent module, installed within the automated programming system, by a bi-directional protocol, the automated programming system including an L-shaped interface plate;
   a composite connection for connecting the intelligent module to the smart interface system; and
   the intelligent module linked to the smart interface system, through the composite connection for communicating information, wherein the L-shaped interface plate is configured between the intelligent module and the smart interface system.

6. The system as claimed in claim 5 wherein:
   the composite connection includes a data port, a control port, and a power port.

7. The system as claimed in claim 5 wherein:
   the intelligent module employs bi-directional communication.

8. The system as claimed in claim 5 wherein:
   the composite connection transmits identification, location, configuration, status, commands, and geometry information between the intelligent module and the smart interface system.

9. The system as claimed in claim 5 further comprising:
   a vacuum system that is on-board.

10. The system as claimed in claim 5 wherein:
    the intelligent module is capable of being hot swapped.

11. The system as claimed in claim 5 wherein:
    the composite connection includes a pin contact scheme with different pin lengths.

12. The system as claimed in claim 5 wherein:
    the composite connection is coupled to the smart interface system via a spring loaded connection.

13. The system as claimed in claim 5 wherein:
    the automated programming system develops a unique address for the intelligent module.

* * * * *

UNITED STATES PATENT AND TRADEMARK OFFICE
CERTIFICATE OF CORRECTION

| | | |
|---|---|---|
| PATENT NO. | : 9,063,531 B2 | Page 1 of 1 |
| APPLICATION NO. | : 11/381696 | |
| DATED | : June 23, 2015 | |
| INVENTOR(S) | : Johnson et al. | |

It is certified that error appears in the above-identified patent and that said Letters Patent is hereby corrected as shown below:

In the Specification:

Column 3, line 18, delete "ahead" and insert therefor --a head--

Signed and Sealed this
First Day of December, 2015

Michelle K. Lee
*Director of the United States Patent and Trademark Office*